US008005950B1

(12) United States Patent
Ashcraft et al.

(10) Patent No.: US 8,005,950 B1
(45) Date of Patent: Aug. 23, 2011

(54) APPLICATION SERVER SCALABILITY THROUGH RUNTIME RESTRICTIONS ENFORCEMENT IN A DISTRIBUTED APPLICATION EXECUTION SYSTEM (75) Inventors: Kenneth Ashcraft, Palo Alto, CA (US); Jon P. McAlister, Millbrae, CA (US); Kevin A. Gibbs, San Francisco, CA (US); Ryan C Barrett, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 435 days.

(21) Appl. No.: 12/331,351

(22) Filed: Dec. 9, 2008

(51) Int. Cl.
G06F 15/173 (2006.01)
G06F 12/00 (2006.01)

(52) U.S. Cl. .................................... 709/224; 709/217

(58) Field of Classification Search .......... 709/223–229, 709/212–217
See application file for complete search history.

(56) References Cited

U.S. PATENT DOCUMENTS

| 5,469,545 | A  | * | 11/1995 | Vanbuskirk et al. | 709/234 |
|---|---|---|---|---|---|
| 7,475,197 | B1 | * | 1/2009  | Bouge et al.      | 711/153 |
| 7,539,631 | B1 |   | 5/2009  | El-Haj            | 705/26  |
| 7,634,646 | B2 |   | 12/2009 | Fujimori et al.   | 713/1   |
| 7,669,026 | B2 |   | 2/2010  | Boss et al.       | 711/165 |
| 2002/0055984 | A1 | | 5/2002  | Chang et al.      | 709/217 |
| 2003/0217077 | A1 | | 11/2003 | Schwartz et al.   | 707/200 |
| 2004/0003347 | A1 | | 1/2004  | Saidenberg et al. | 715/511 |
| 2004/0193574 | A1 | | 9/2004  | Suzuki            | 707/2   |
| 2005/0015804 | A1 | | 1/2005  | LaJoie et al.     | 725/44  |
| 2005/0021917 | A1 | * | 1/2005 | Mathur et al.     | 711/159 |
| 2005/0097132 | A1 | | 5/2005  | Cochran et al.    | 707/104.1 |
| 2005/0177832 | A1 | * | 8/2005 | Chew              | 718/104 |
| 2005/0179918 | A1 | | 8/2005  | Kurumisawa et al. | 358/1.9 |
| 2006/0075101 | A1 | | 4/2006  | Anerousis et al.  | 709/225 |
| 2007/0112785 | A1 | | 5/2007  | Murphy et al.     | 707/10  |
| 2007/0174839 | A1 | * | 7/2007 | Takahashi et al.  | 718/100 |
| 2008/0082955 | A1 | | 4/2008  | Andreessen et al. | 717/100 |
| 2008/0091902 | A1 | | 4/2008  | Lee               | 711/165 |
| 2008/0307438 | A1 | | 12/2008 | Creamer et al.    | 719/318 |
| 2009/0106424 | A1 | | 4/2009  | Safari et al.     | 709/226 |
| 2009/0117889 | A1 | | 5/2009  | Varanda           | 455/418 |
| 2010/0043016 | A1 | | 2/2010  | Anzai             | 719/320 |
| 2010/0114705 | A1 | | 5/2010  | Hoyle             | 705/14.54 |

* cited by examiner

Primary Examiner — Zarni Maung
(74) Attorney, Agent, or Firm — Morgan, Lewis & Bockius LLP (57) ABSTRACT In an application execution system having a plurality of application servers, each application server includes non-volatile storage for storing a plurality of applications, volatile storage and computational resources for executing applications in response to requests received by the application execution system and for returning results to the requestors. In addition, each application server includes instructions for conditionally terminating execution of the respective application prior to returning the result if the respective application violates any of a plurality of execution restrictions. The execution restrictions in aggregate maintain scalability of the application execution system with respect to at least one or more of the following limits: number of applications that can be executed and number of requests that can be processed per period of time.

51 Claims, 7 Drawing Sheets

APPLICATION SERVER SCALABILITY THROUGH RUNTIME RESTRICTIONS ENFORCEMENT IN A DISTRIBUTED APPLICATION EXECUTION SYSTEM

RELATED APPLICATIONS

This application is related to U.S. patent application Ser. No. 12/060,798, filed Apr. 1, 2008, entitled "Efficient Hosting in a Distributed Application Execution System" which is incorporated by reference herein in its entirety.

TECHNICAL FIELD

The disclosed embodiments relate generally to methods and systems, sometimes called application servers, for hosting and executing large numbers of heterogeneous applications.

BACKGROUND

In general, increases in an application's popularity could present a variety of scalability problems that negatively impact a user's experience. For example, users could experience slower response times, slower page loading, and increased time outs on page requests. These scalability problems are typically alleviated by allocating additional capacity to the application such as more storage, more memory, more CPUs, and more machines in general.

Allocating or installing more computing capacity may be a reasonable solution when increases in an application's popularity are experienced over a prolonged period of time, or when usage of the application is predictable. Similarly, when an application experiences a decrease in usage, removing computing capacity previously allocated to the application may be a reasonable solution, especially when the decrease is experienced over a prolonged period of time, or when the decrease is predictable. However, the popularity of an application is often unpredictable, due to a variety of factors (e.g., time of day, current events, advertising, trends), and fluctuates to a large extent, which creates load spikes and dips in the application execution or hosting system.

Predefined allocations of computing resources are inefficient solutions for handling temporary load spikes and dips. Increasing or installing more computing resources to handle a load spike is inefficient, since the additional pre-allocated resources go unused when the spike disappears (e.g., when the spike in demand subsides, or the application's popularity dips). Similarly, decreasing computing resources allocated to an application when its popularity declines is also inefficient, since future usage spikes will require the re-allocation of previously removed resources back to the application.

To complicate matters further, application systems may host a large number of heterogeneous applications, each with its own set of fluctuating resource requirements. Pre-allocation of resources, for the reasons discussed above, is often an inefficient solution for ensuring consistent positive user experiences among heterogeneous applications hosted on an application system.

SUMMARY

In an application execution system having a plurality of application servers, each application server includes non-volatile storage for storing a plurality of applications, volatile storage and computational resources for executing applications in response to requests received by the application execution system. Each application server also includes instructions for storing in non-volatile storage applications distributed to the application server, for loading a plurality of respective applications into volatile storage, for executing a respective application in response to a respective received request from a client, and for returning a result to the request. In addition, each application server includes instructions for conditionally terminating execution of the respective application prior to returning the result if the respective application violates any of a plurality of execution restrictions. The execution restrictions include two of more of the following: a response time limit; an average response time limit over multiple executions of the respective application; a volatile memory usage limit that limits how much volatile memory can be used by each execution of the respective application; a restriction on using non-volatile storage of the application server; and a requirement that any state information to be retained after returning the result is either sent to the client for storage, or retained in a datastore accessible by all the application servers. The execution restrictions in aggregate maintain scalability of the application execution system with respect to at least one or more of the following limits: number of applications that can be executed and number of requests that can be processed per period of time.

In another aspect of the invention, a method of operating an application server in a system having a plurality of application servers is disclosed. The method comprises storing in non-volatile storage applications distributed to the application server, loading a plurality of respective applications into volatile storage, executing a respective application in response to a respective received request from a client, and returning a result to the request. In addition, the method includes conditionally terminating execution of the respective application prior to returning the result if the respective application violates any of a plurality of execution restrictions. The execution restrictions include two of more of the following: a response time limit; an average response time limit over multiple executions of the respective application; a volatile memory usage limit that limits how much volatile memory can be used by each execution of the respective application; a restriction on using non-volatile storage of the application server; and a requirement that any state information to be retained after returning the result is either sent to the client for storage, or retained in a datastore accessible by all the application servers. The execution restrictions in aggregate maintain scalability of the application execution system with respect to at least one or more of the following limits: number of applications that can be executed and number of requests that can be processed per period of time.

BRIEF DESCRIPTION OF THE DRAWINGS

Like reference numerals refer to corresponding parts throughout the several views of the drawings.

DESCRIPTION OF EMBODIMENTS

Figure 1:
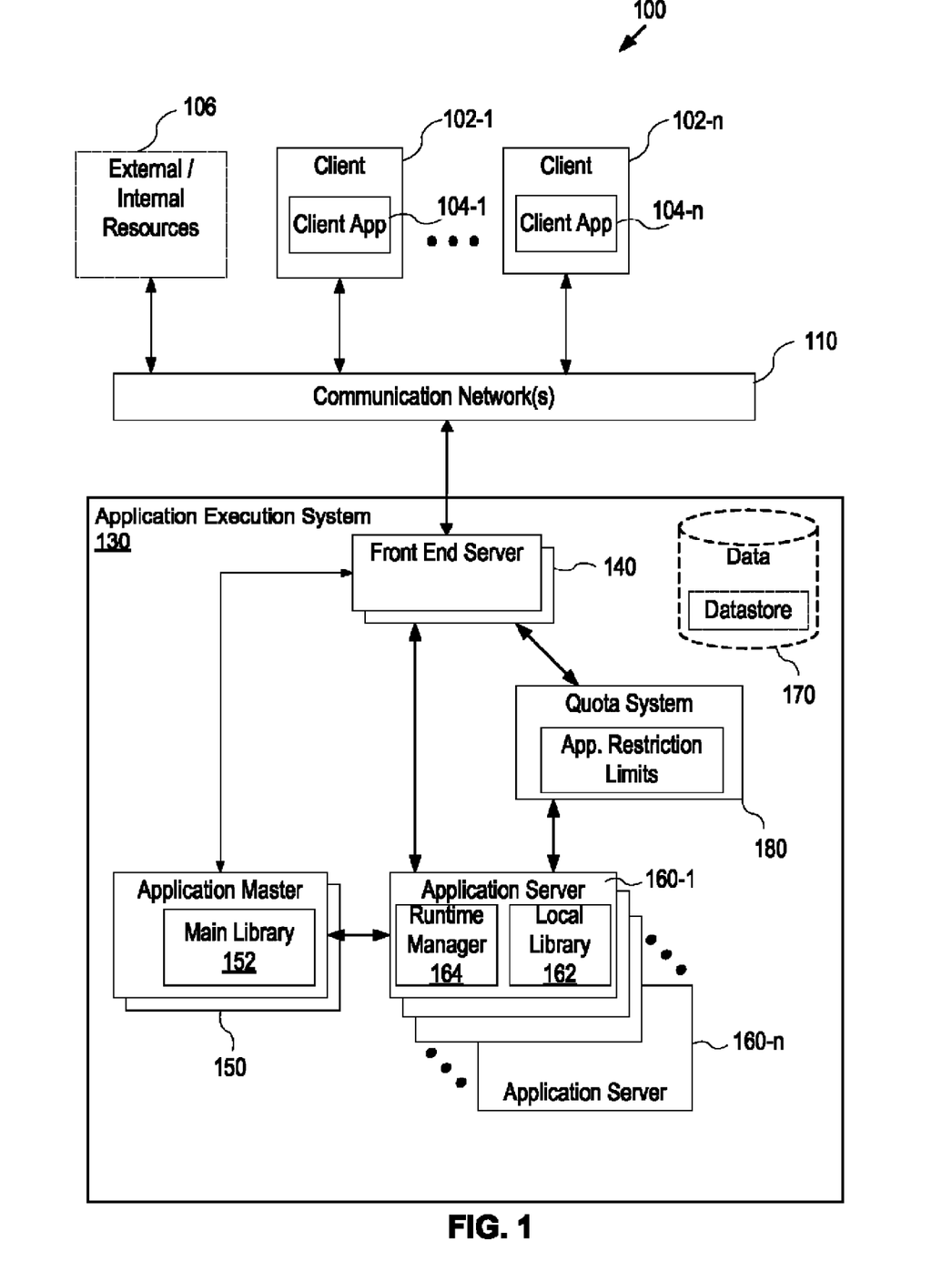
FIG. 1 is a block diagram of a distributed computing system including an application execution system according to some embodiments of the invention.

FIG. 1 is a block diagram of a distributed computing system 100 including an application execution system 130 connected to a plurality of clients 102 (e.g., 102-1 . . . 102-*n*) through a network 110 such as the Internet, other wide area networks, local area networks, metropolitan area networks, wireless networks, or any combination of such networks. In some embodiments, a respective client 102 contains one or more client applications 104 (e.g., 104-1 . . . 104-*n*), such as a web browser, for submitting application execution requests to the application execution system 130. The client 102 (sometimes called the "client device" or "client computer") may be any computer or similar device through which a user of the client 102 can submit requests to and receive results or services from the application execution system 130. Examples include, without limitation, desktop computers, notebook computers, tablet computers, mobile devices such as mobile phones, personal digital assistants, set-top boxes, or any combination of the above.

In some embodiments, the application execution system 130 include a front-end server 140, which receives application execution requests from clients 102 and returns results to the requesting clients. The front-end server 140 receives, from the application master 150, an application distribution map which may include resource usage information that can be used to route requests received from client(s) 102. More information regarding the application distribution map is provided in U.S. patent application Ser. No. 12/060,798, filed Apr. 1, 2008, entitled "Efficient Hosting in a Distributed Application Execution System" which is incorporated by reference herein in its entirety.

The application execution system 130 include a plurality of application servers 160 (e.g., 160-1 through 160-*n*). As described in more detail below with reference to FIG. 5, each of the application servers 160 includes non-volatile storage for storing a plurality of applications in a local library 162, volatile storage, and computational resources for executing applications in response to requests received by the application execution system 130. The application servers 160 may include a runtime manager 164, which as further discussed below with reference to FIGS. 2 and 3C, enforces resource limits and restrictions for various resources consumed by an application during execution. In some embodiments, the application execution system 130 includes a quota system 180 which, in conjunction with the runtime manager 164, implements a plurality of application restriction limits as further discussed below.

The application execution system 130 also includes an application master 150 that distributes applications, from a main library 152 having a plurality of applications, among the application servers 160. In the embodiment shown in FIG. 1, the main library 152 is stored in the application master 150. Alternately, the main library 152 may be stored remotely from the application master, such as in a datastore 170. In some embodiments, each application of the plurality of applications in the main library 152 is a web application that is responsive to HTTP requests. However, the present invention can also be used in non-web based environments, in which case the applications need not be web-based applications.

In some embodiments, the application execution system 130 also includes a datastore 170 accessible to at least the application master 150 and the front-end server 140, for sharing information about the location of applications among the application servers 160 and resource usage or loading information with respect to the application servers 160.

Optionally, the distributed system 100 includes additional resources 106, which may be located either internally or externally to the system 100, for use when executing applications in the application execution system 130. For example, an application executed by the application execution system 130 may access information in one or more of the additional resources 106 in order to process a request received from a respective client 102. These additional resources may include one or more of: other applications and data provided by web services (e.g., web feed data from sources such as blog entries, headlines, podcasts, etc.).

Figure 2:
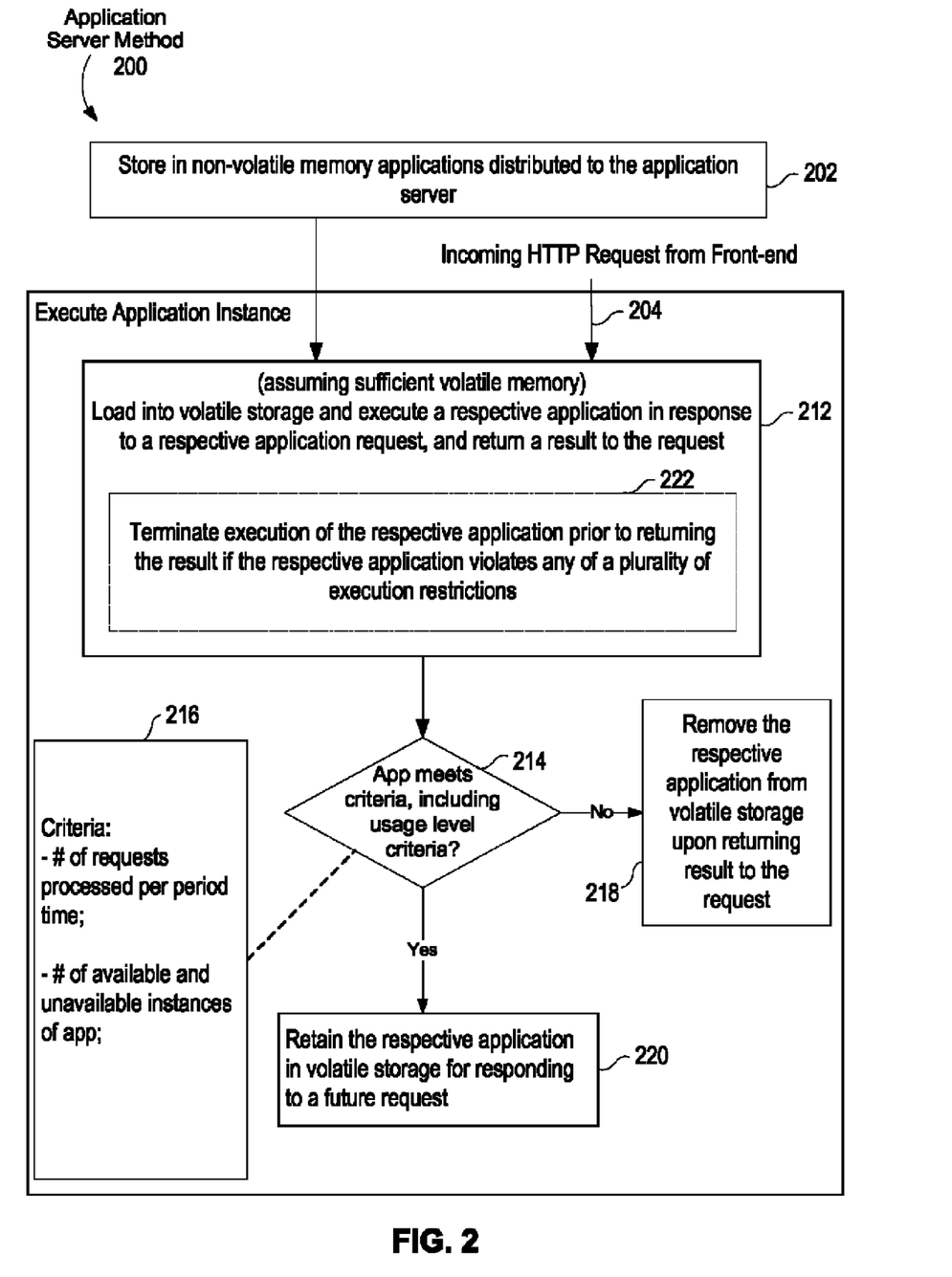
FIG. 2 is a flow diagram illustrating an exemplary method performed at an application server according to some embodiments of the invention.

FIG. 2 is a flow diagram illustrating a method 200 performed by an application server according to some embodiments. The applications distributed to the application server by the application master 150 are stored in the application server's non-volatile memory (202). Assuming that there is sufficient volatile memory, in response to an application request (204) from the front-end 140, the application server 160 loads the requested application into volatile storage, executes the requested application, and returns a result to the request (212). In some embodiments, the application servers prevent or terminate execution of the application if the application violates any of the execution restrictions further discussed below.

The application server may remove one or more applications from volatile memory before performing operation 212 when there is insufficient volatile memory to process the request. Alternatively, the application server may automatically remove applications from volatile memory when the amount of available volatile storage is below a predefined threshold.

In some embodiments, after returning the result to the request, the application server can either remove the respective application from volatile storage (218), or retain the respective application in volatile storage (220) for responding to future requests, by determining whether predefined criteria has been met (214). In some embodiments, the predefined criteria (216) used by the application server include usage level criteria, which may include the number of requests for the application processed per period of time. The predefined criteria may also include caching criteria, which may include the number of respective application instances in volatile storage available for handling new requests, and the number of respective application instances handling active requests and therefore not available for handling new requests. Cached application instances are discussed in more detail below with reference to FIG. 3A. The predefined criteria may also include error criteria, which may be based on the number of errors encountered during execution of the application, and the type of errors encountered. For example, the application server may remove the respective application from volatile storage if severe errors are encountered during N (e.g., 5, 10 or 20) consecutive executions of the application.

For applications that fail to meet the predefined criteria (214—No), the application server removes the respective applications from volatile storage upon returning the result to the request (218). In some embodiments, the application server may remove the respective applications from volatile storage according to a predefined order for removal. For example, the application server may remove the least recently used application.

In some embodiments, when determining which application instance to remove from volatile storage, the application servers may take into account the service quality levels of the applications for which instances are stored in volatile memory. The service quality level of each application may be based on the level of service requested, or paid for. Various forms of preferences (for retention of application instances in volatile memory) may be given to applications with high service quality levels, compared to applications with lower service quality levels. For example, lower service quality level application instances may be evicted before higher service quality level application instances whenever a predefined condition is true. The predefined condition may relate to numbers or ratios of lower and higher service quality level application instances loaded in volatile memory. Alternately, scores may be computed to determine which application instances to unload from volatile memory, and computation of the scores may take into account the service quality levels of the applications.

For applications that meet the predefined criteria (214-Yes), the application server retains the respective applications in volatile storage for responding to future requests for the application (220). In some embodiments, the application server retains more than one application instance of the respective application in volatile storage in accordance with predefined caching criteria. In some embodiments, the application server limits the number of application instances in volatile storage. For example, the application server may limit the total number of application instances in volatile memory to ensure that there is sufficient volatile memory for other processing tasks. Alternatively, the application server may limit the number of instances of a respective application to ensure that other requested applications have access to sufficient volatile memory to service their requests.

In some embodiments, the application server may terminate (222) execution of the respective application prior to returning the result if the respective application violates any of a plurality of execution restrictions. These execution restrictions may include application resource limits for limiting an application's consumption of system resources during runtime (e.g., a response time limit, an average response time limit over multiple executions of an application, a volatile memory usage limit that limits the amount of volatile memory used by each execution of an application). In some embodiments, the same application resource limits are applied to all applications (e.g., the volatile memory usage limit is the same for all applications). For example, the application execution system may terminate execution of an application if the application's run time or execution time exceeds the response time limit. Alternatively, the application resource limits may vary between applications. Optionally, in embodiments where the average response time for an application is frequently or periodically updated, the application execution system may terminate execution of the application if the application's average response time exceeds the average response time limit (e.g., 0.5 seconds). For example, multiple instances (e.g., all instances being executed) of the same application may all be terminated if, for some reason, the average response time of the application extends beyond the applicable resource limit. The application execution system may also restrict the number of requests processed per period of time for an application, the number of CPU cycles per period of time, the stack size associated with the execution of an application, and other resource usage data as further discussed with reference to FIG. 4 (Resource Usage Data 434).

The execution restrictions may also prohibit certain actions performed by applications using one or more predefined application programming interfaces (APIs). These execution restrictions may restrict the use of non-volatile storage of the application server by an application during execution by preventing the application code from reading or accessing data stored in non-volatile storage. In addition the execution restrictions may govern the storage of state information by requiring state information (to be retained after returning the result) to either be sent to the client for storage, or retained in a datastore accessible by all application servers in the application execution system. Other execution restrictions may include restrictions on: opening network connections; creating new processes by an application, including the creation of threads by the application; making system calls by an application; and other system function calls. In some embodiments, to maintain scalability of the application execution system with respect to number of applications that can be executed and number of requests that can be processed per period of time, the execution restrictions include a restriction requiring all applications to execute within a secure execution environment. In these embodiments, external access to memory locations within the application servers is prohibited. The application execution system may also monitor and enforce restrictions on the frequency of certain actions performed by the applications that impact system performance by monitoring the frequency of calls (made by an application) to APIs associated with these restricted actions (e.g., number of times per period of time that the application calls the API(s) for accessing a datastore, number of times per period of time that the application calls the API(s) for accessing an external web service).

As previously discussed with reference to FIG. 1, in some embodiments, the application execution system includes a quota system 180. The monitoring and enforcement of certain execution restrictions described above may involve the quota system 180, which maintains aggregate quota information for each application. When an application needs to consume a system resource, the application execution system may consult the quota system to ensure that the application has not exceeded quota or threshold limits. For example, the system may include a restriction on the number of times per day the application can access the datastore (e.g., 2,000,000 calls per day) using the associated API (e.g., the Datastore Interface 572 FIG. 5). Before the application can call the Datastore Interface 572, the system checks the number of calls to the Datastore Interface 572 (made by a respective application on all application servers) to ensure that the application is still within its quota limit (e.g., 2,000,000 calls per day).

Figure 3A:
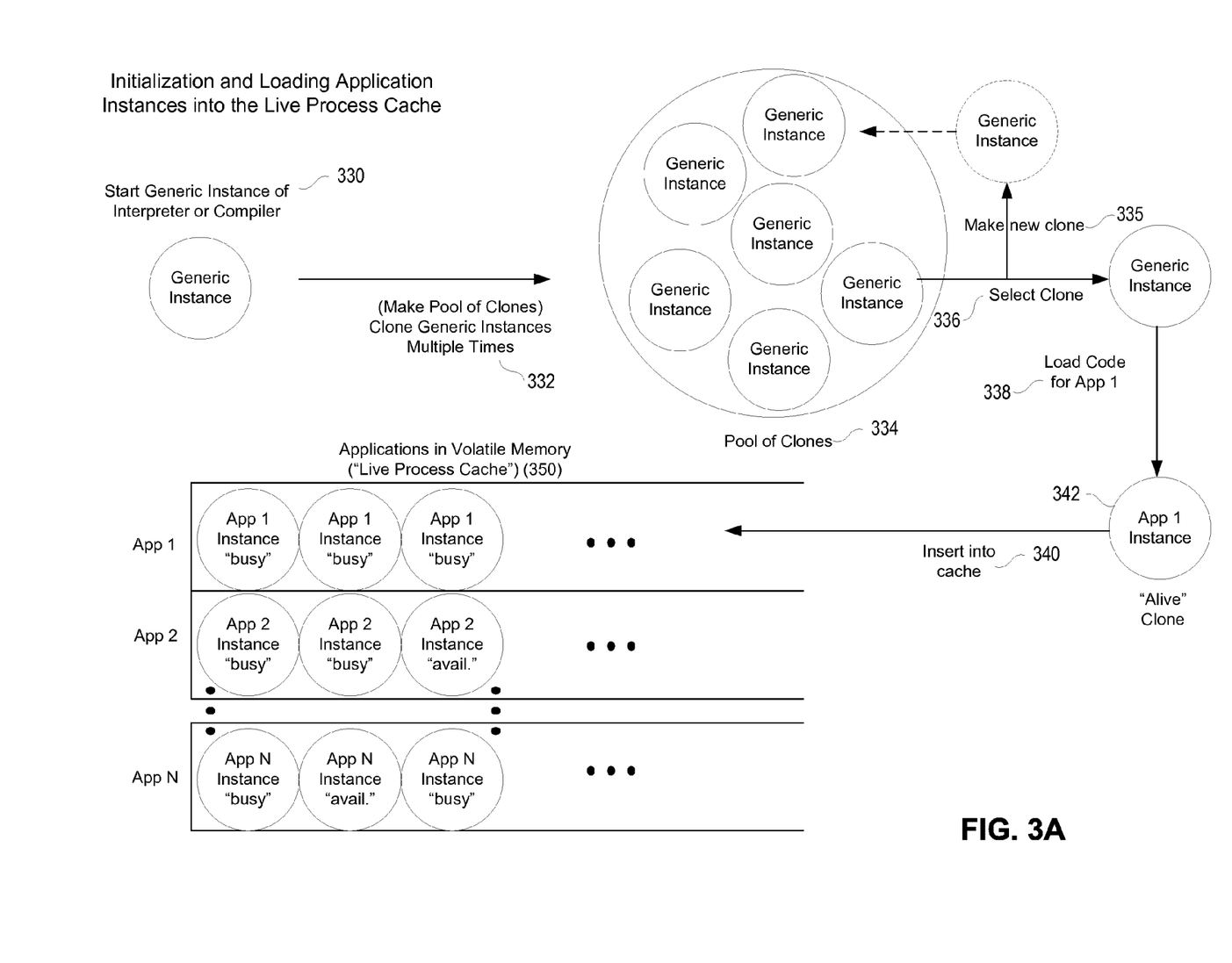
FIG. 3A is a conceptual diagram illustrating examples of initializing and loading application instances according to some embodiments of the invention.

FIG. 3A is a conceptual diagram of a process for managing application instances in volatile memory by the application server in accordance with some embodiments of the invention. The application servers actively manage application instances in volatile memory through a live process cache 350. The application server first initiates a generic application instance 330, sometimes called a "generic instance." The generic instance is "cloned" multiple times (332) resulting in a "pool of clones" (334) of the generic instance. When a request for an application is received, the application server removes (336) a generic instance clone from the "pool of clones" and loads (338) the code for the requested application into the generic instance clone to produce an application instance 342. In some embodiments, when a clone is removed from the "pool of clones," a request is issued (335) to create a new generic instance clone to replace the one selected. The code for the requested application may be associated with any of a variety of programming languages including but not limited to: Java, Perl, Python, or C. In some embodiments, the application is executed using an interpreter, while in other embodiments the application code is compiled and linked (as needed) with any other code (e.g., library procedures) to produce code that is ready for execution by the application server, in the context of the application server's operating system.

In FIG. 3A, the application server loads (338) the code for "App 1" into a generic instance in response to a request received for "App 1." The "App 1" instance may be referred to as "live" or "alive" since it contains code that is readily executable by the application server. The App 1 instance is loaded into a cache (e.g., "Live Process Cache") 350. The cache may contain other instances of App 1 as well as instances of other requested applications (e.g., App2 . . . AppN). These application instances in the Live Process Cache 350 are either "busy" or "available," although other transitional states could be used in addition in other embodiments. A "busy" application instance is one that is processing a current request, and therefore cannot process another incoming request until it finishes processing the current request. The "available" instances are ready to process any received request for the respective application.

Figure 3B:
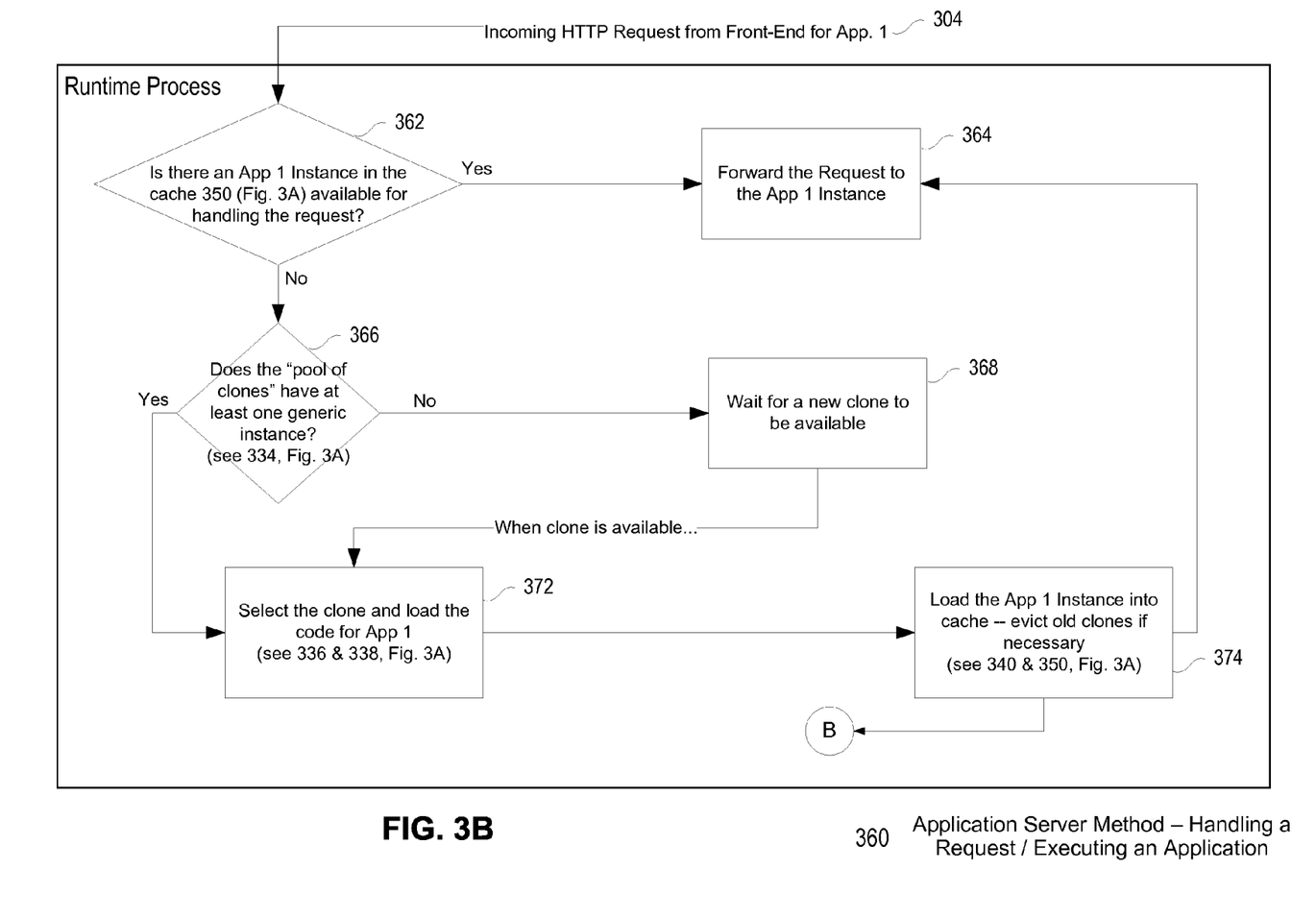
FIGS. 3B-3C is a flow diagram illustrating an exemplary runtime process for handling a request for an application in accordance with some embodiments of the invention.
Figure 3C:
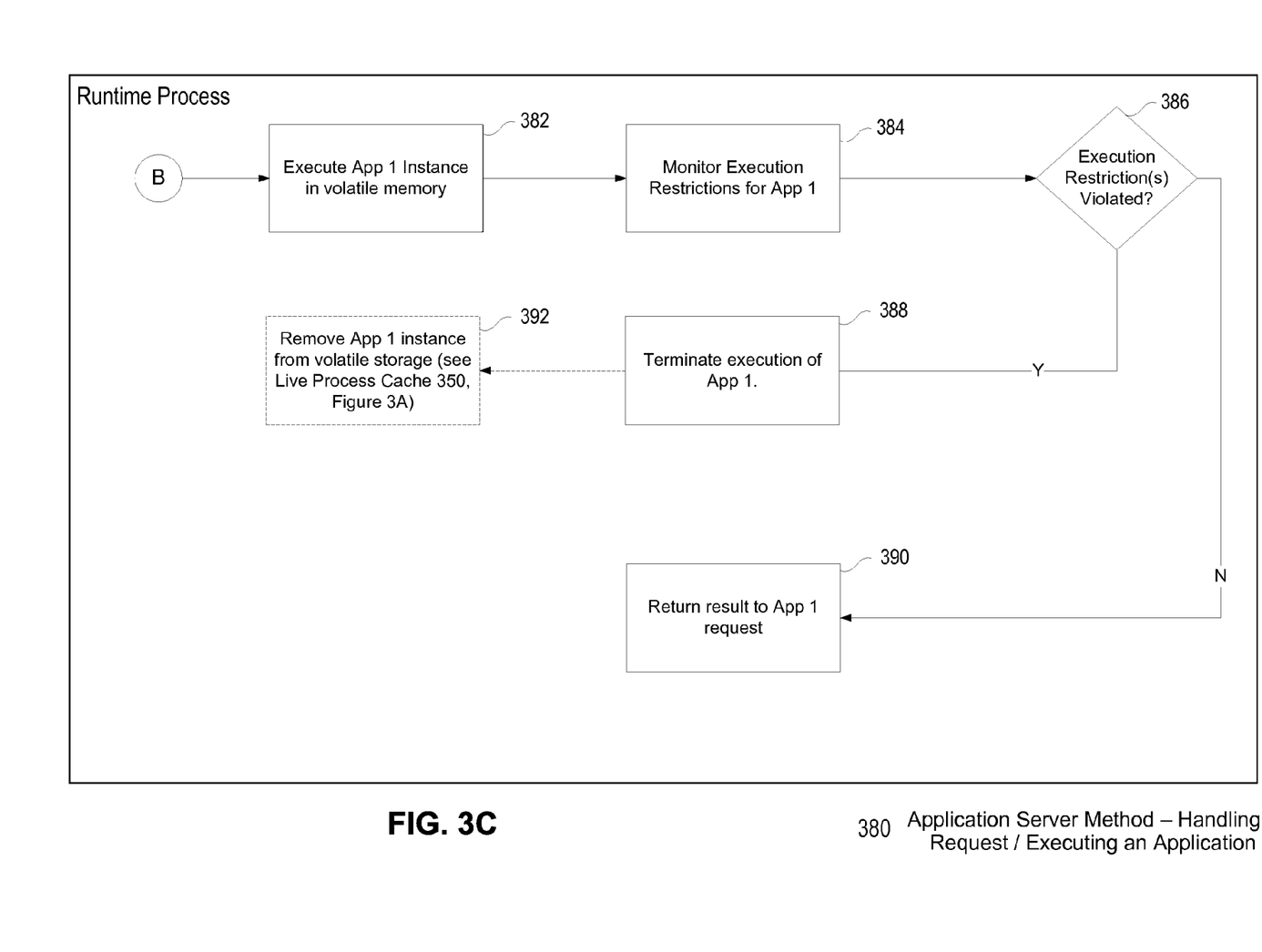

FIGS. 3B-3C is a flow diagram illustrating an example of a runtime process for handling a request for an application at the application server in accordance with some embodiments. For the purposes of this example, it may be assumed that the application server has sufficient resources available to handle an incoming request to execute an application. Upon receiving (304) a request from the front-end for "App 1," the application server queries the cache 350 (FIG. 3A) for an available "App 1" instance for handling the request. If the cache returns an available "App 1" instance (362-Yes), the request is forwarded (364) to the returned instance for processing. If the cache does not return an available "App 1" instance (362—No), the application server determines (366) if the "pool of clones" 334 has at least one generic instance. Other application instances (e.g., the least recently used instance) are removed from the cache if necessary (e.g., to make room for new application instances). If there are no generic instances available (366—No), the process waits (368) for a generic instance clone to be available before performing operations (372) and (374). If there are generic instances available (366-Yes), a generic instance clone is selected (372) from the "pool of clones." The App 1 code is loaded (372) onto the selected generic instance, and the App 1 instance is loaded (374) into the live process cache 350. The App 1 instance is then executed (382) in volatile memory. During execution of App 1, a plurality of execution restrictions are monitored (384), such that the application server may terminate (388) execution of App 1 if one or more execution restrictions are violated (386-Y). In addition, upon termination of the application, the application server may return an error message to the requesting client. In some embodiments, application server also removes (392) the terminated App 1 instance from volatile storage (e.g., Live Process Cache 350). If no execution restrictions are violated (386-N) during execution of App 1, App 1 completes processing the request and returns (390) a result.

Figure 4:
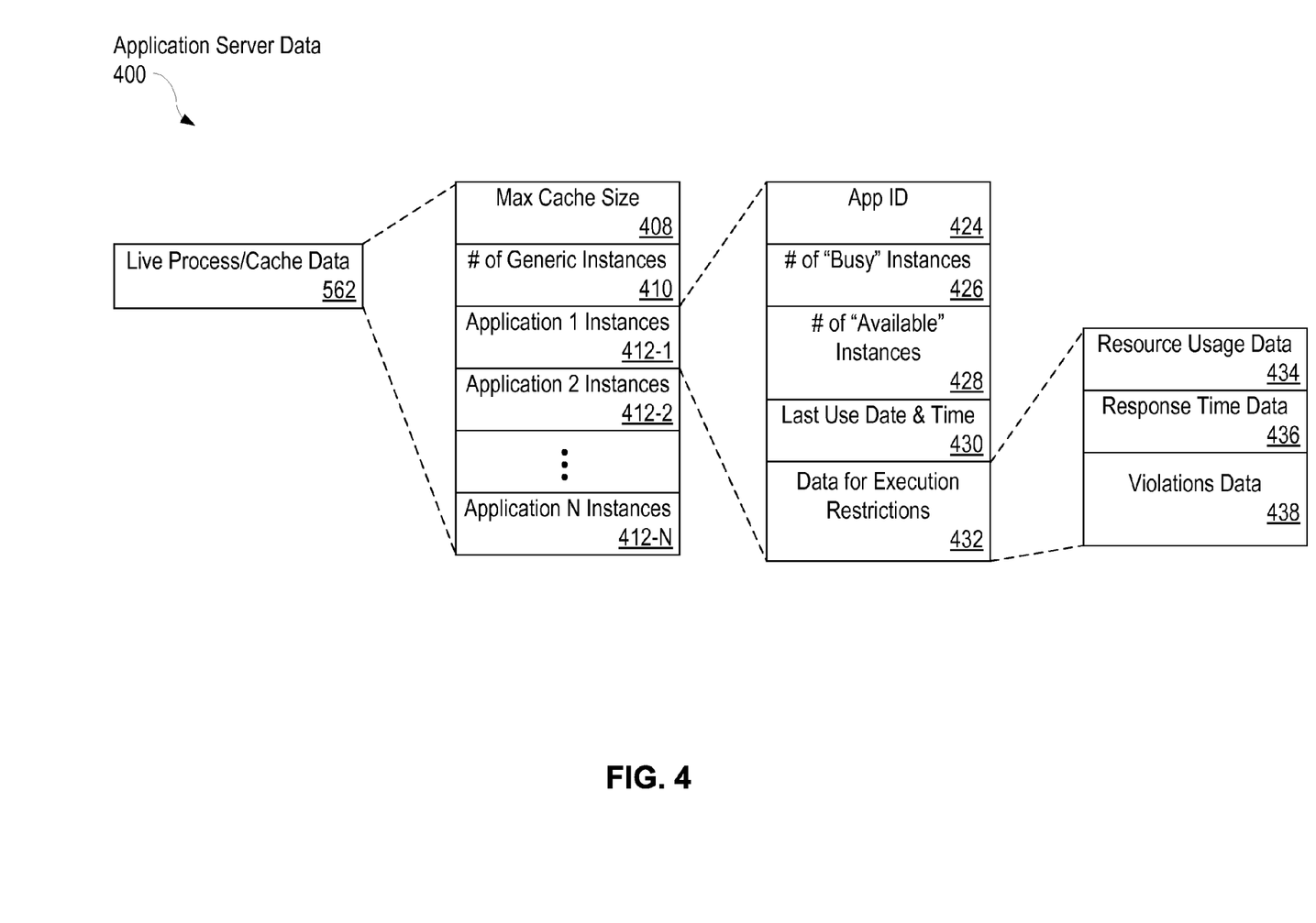
FIG. 4 is a block diagram illustrating a data structure for use by the application server for storing information relating

FIG. 4 is a block diagram of a table or other data structure (live process ca cache data) 562 for storing information relating to application instances stored in volatile memory (e.g., Live Process Cache 350, FIG. 3A) for processing application requests in accordance with some embodiments of the invention. As shown in FIG. 4, live process cache data 562 includes the following items of information, or a subset or superset thereof:
  cache size information 408, which may be represented (for example) in terms of memory capacity (e.g., a number of gigabytes), or a maximum number of application instances that can be stored in the live process cache 350;
  the number of generic instances 410 currently available for allocation; and
  information 412 about each of the applications, or application instances, currently in the live process cache 350. For example, information 412 may indicate for each application having at least one instance in the live process cache 350, the identity 424 of the application, the number 426 of "busy" instances of the application, the number 428 of "available" instances of the application, last use information 430 (e.g., the date/time of last use of the application), and data for execution restrictions 432 or other information for enabling implementation of a cache eviction policy. Examples of execution restrictions data 432 including resource usage data 434, response time data 436, and violations data 438 are further described below.

Resource usage data 434, which allows the system to monitor the amount of system resources consumed by an application, may include any combination of the following (per period of time): number of CPU megacycles, number of HTTP requests, amount of bandwidth consumed by incoming requests for the application ("bandwidth in"), and amount of bandwidth consumed by transmission of outgoing results to requests for the application ("bandwidth out"). In addition, resource usage data 434 may also monitor the frequency of certain activities such as accessing a datastore, accessing internal or external application resources 106 (e.g., web services, web feeds, news feeds), and sending email from the application. These monitored activities are further discussed above with reference to FIG. 2.

Response time data 436 includes data indicating the amount of time it takes the application to issue a response to serve a request. Violations data 438 may include data indicating the frequency of restriction violations associated with the application (e.g., number of response time violations over a period of time, type of violated restriction(s), aggregate number of violations). In some embodiments, violations data 438 is updated during application execution. For example, during execution of an application, the application server (executing the application) may monitor and update violations data 438 to ensure compliance with application restrictions.

Figure 5:
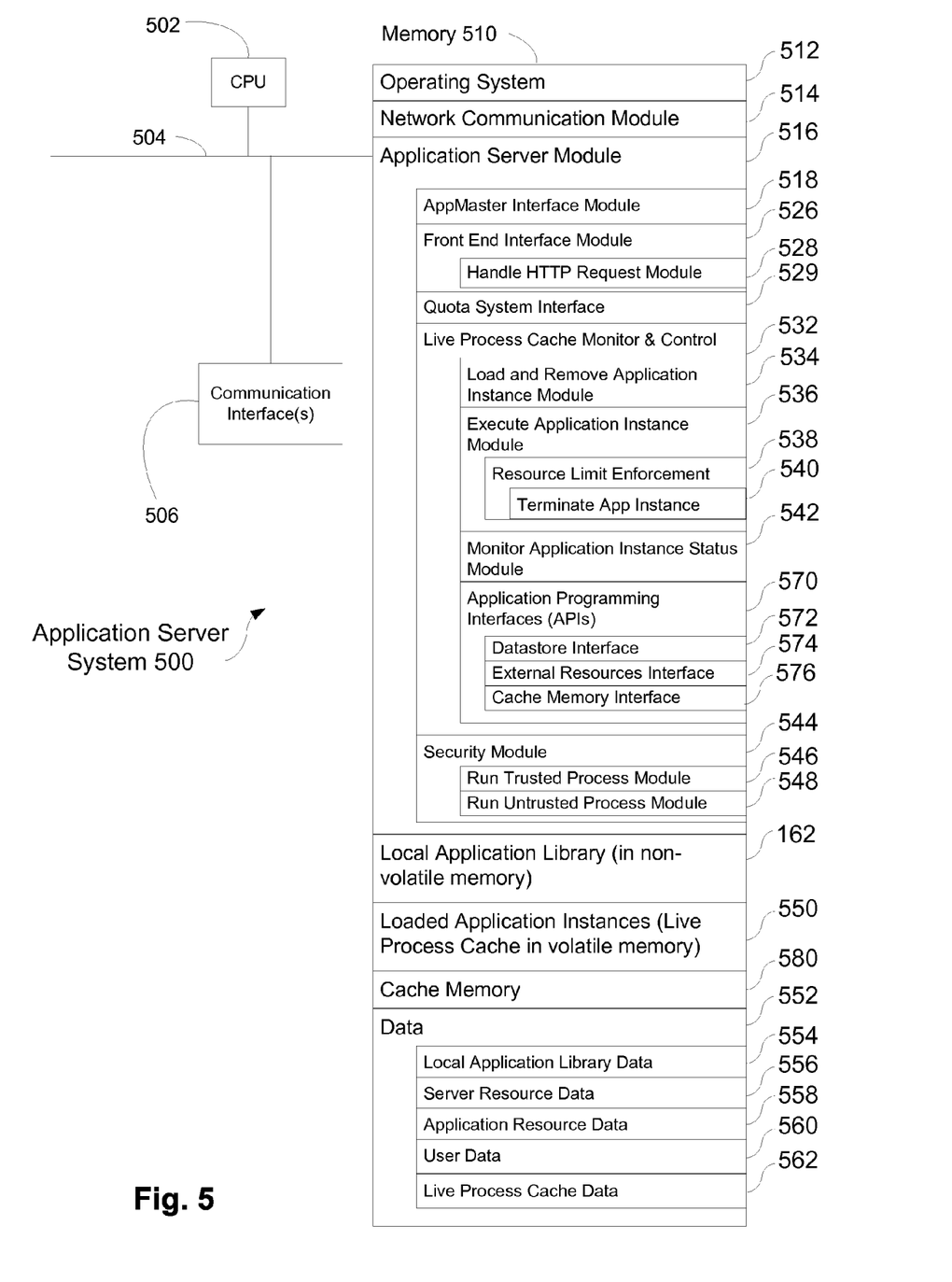
FIG. 5 is a block diagram of an application server in accordance with some embodiments of the invention.

FIG. 5 is a block diagram of an application server 500, which may be implemented using one or more servers, in accordance with some embodiments of the invention. For ease of explanation, the application server 500 is herein described as implemented using a single server or other computer. The application server 500 generally includes one or more processing units (CPU's) 502, one or more network or other communications interfaces 506, memory 510, and one or more communication buses 504 for interconnecting these components. The communication buses 504 may include circuitry (sometimes called a chipset) that interconnects and controls communications between system components. Memory 510 may include high speed random access memory and may also include non-volatile memory, such as one or more magnetic disk storage devices. Memory 510 may include mass storage (e.g., datastore 170, FIG. 1) that is remotely located from the central processing unit(s) 502. Memory 510, or alternately the non-volatile memory device(s) within Memory 510, comprises a computer readable storage medium. In some embodiments, Memory 510 stores the following programs, modules and data structures, or a subset thereof:

an operating system 512 that includes procedures for handling various basic system services and for performing hardware dependent tasks;

a network communication module 514 that is used for connecting the application server 500 to other computers via the one or more communication network interfaces 506 (wired or wireless) and one or more communication networks (e.g., communication networks 110), such as the Internet, other wide area networks, local area networks, metropolitan area networks, and the like;

an application server module 516 for processing application requests. In some embodiments, the application server module 516 includes an application master interface module 518 for interfacing with the application master 150 (FIG. 1), a front-end interface module for interfacing with the front-end 140, a quota system interface module 529 for interfacing with the quota system 180, and a live process cache monitor and control module 532 for managing application instances in the live process cache 350 (FIG. 3A). The application server module 516 may also store a security module 544 for executing untrusted processes (Run Untrusted Process Module) 548 and trusted processes (Run Trusted Process Module) 546. Some of the procedures included in the application server module 516 are further described below.

a local application library 162, for storing the applications distributed to the application server by the application master 150;

application instances in volatile memory 550 (e.g., in a live process cache 350, FIG. 3A) for servicing application requests. In some embodiments, there is at least one application instance for an application in volatile memory;

data 552 includes data used primarily by the application master 150 (e.g., local application library data 554, server resource data 556, application resource data 558). More information regarding data used by the application master is provided in U.S. patent application Ser. No. 12/060,798, filed, Apr. 1, 2008, entitled "Efficient Hosting in a Distributed Application Execution System" which is incorporated by reference herein in its entirety. When needed, data 552 includes user data 560, which may include data received from a requesting user (e.g., user name, passwords, user preferences, profiling information) and/or data produced or retrieved for the requesting user by the application server. In addition, data 552 may include live process cache data 562, described with reference to FIG. 4;

an optional Cache Memory 580, for temporarily storing data and making the data for a respective application accessible to all instances of that application.

In some embodiments, the application master interface module 518 includes procedures for adding or removing applications from the non-volatile storage of the application server. The application master interface module 518 may also include procedures for sending usage information on application resources and server resources to the application master. In some embodiments, the front end interface module 526 includes procedures for handling application requests 528 forwarded from the front end 140. More information regarding the application master and the front-end is provided in U.S. patent application Ser. No. 12/060,798, filed, Apr. 1, 2008, entitled "Efficient Hosting in a Distributed Application Execution System" which is incorporated by reference herein in its entirety.

Procedure(s) (Live Process Cache Monitor & Control) 532 for managing application instances in the live process cache 350 may include procedures (Load and Remove Application Instance Module) 534 for loading and removing application instances into the live process cache in accordance with application usage and available volatile memory as previously discussed with reference to FIG. 2, procedures (Execute Application Instance Module) 536 for executing application instances when processing application requests. The Execute Application Instance Module 536 may also include procedures (Resource Limit Enforcement) 538 for limiting resource consumption of a particular application. For example, an application that consumes more resources than a limit or threshold may be terminated (Terminate App Instance) 540, as previously described with reference to FIG. 2. The resource limit may be a predefined amount or the threshold may vary depending on factors such as the number of requests for the application. For example, applications that receive higher numbers of requests may have a higher threshold before the application instance is terminated. Alternatively, the threshold may also depend on the amount of processing resources (e.g., one or more of: CPU time, "wall clock" time (i.e., total elapsed real time), memory, communication bandwidth, and number of system function calls made) consumed by the application. The threshold(s) may be applied per execution of an application, or to a running average of resources used over multiple executions of the application. An application instance that consumes resources above a corresponding threshold may be terminated.

The procedures (Live Process Cache Monitor & Control) 532 may also include application programming interfaces (APIs) 570 that enable and restrict activities that applications may engage in during execution. The APIs 570 may include any combination of the following: a Datastore Interface 572 for interfacing with a datastore (e.g., the datastore 170); a Cache Memory Interface 576 for interfacing with shared Cache Memory 580; and an External Resources Interface 574 for interfacing with external resources (e.g., other applications, other websites, web services). In embodiments having the Cache Memory 580 and the Cache Memory Interface 576, an application instance can store data (e.g., data copied from a datastore) for high speed access by all instances of the same application. The application must not rely upon retention of data by the Cache Memory 580; for example, the data stored in the Cache Memory 580 for a respective application may be deleted whenever there are no longer any active instances of the application. The Datastore and Cache Memory mechanisms for sharing information between instances of the same application are accessibly only through the APIs provided by the application execution system, which facilitates enforcement of application restrictions associated with both durable and temporary storage of data that can be shared between application instances.

The live process cache monitor & control module 532 may also include procedures for monitoring the status of application instances (Monitor Application Instance Status Module) 542. For example, the status of the application instances may be "busy," "available," or any transitional state in between (see FIG. 3A).

FIG. 5 shows an application server system and is intended more as a functional description of the various features which may be present in a set of servers than as a structural schematic of the embodiments described herein. In practice, and as recognized by those of ordinary skill in the art, items shown separately could be combined and some items could be separated. For example, some items shown separately in FIG. 5 could be implemented on single servers and single items could be implemented by one or more servers. The actual number of servers used to implement each such subsystem and how features are allocated among them will vary from one implementation to another, and may depend in part on the amount of data traffic that the system must handle during peak usage periods as well as during average usage periods.

Each of the above identified elements in FIG. 5 may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, Memory 510 may store a subset of the modules and data structures identified above. Furthermore, Memory 510 may store additional modules and data structures not described above.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. An application execution system, comprising:
a plurality of application servers, each of the application servers including non-volatile storage for storing a plurality of applications, volatile storage and computational resources for executing applications in response to requests received by the application execution system;
each application server of the plurality of application servers including instructions for:
storing in non-volatile storage applications distributed to the application server;
loading a plurality of respective applications into volatile storage, executing a respective application in response to a respective received request from a client, and returning a result to the request;
conditionally terminating execution of the respective application prior to returning the result if the respective application violates any of a plurality of execution restrictions, the plurality of execution restrictions including two of more of the following:
a response time limit;
an average response time limit over multiple executions of the respective application;
a volatile memory usage limit that limits how much volatile memory can be used by each execution of the respective application;
a restriction on using non-volatile storage of the application server; and
a requirement that any state information to be retained after returning the result is either sent to the client for storage, or retained in a datastore accessible by all the application servers in the plurality of application servers;
wherein the plurality of execution restrictions in aggregate maintain scalability of the application execution system with respect to at least one or more of the following limits: number of applications that can be executed and number of requests that can be processed per period of time.

2. The system of claim 1, wherein all state information to be retained after returning the result is written using one or more predefined application programming interfaces (APIs).

3. The system of claim 2, wherein the one or more APIs include an API for accessing stored state information.

4. The system of claim 1 wherein the restriction on using non-volatile storage excludes reading and accessing data stored in the non-volatile storage.

5. The system of claim 1 wherein the plurality of execution restrictions further includes a restriction on opening network connections.

6. The system of claim 1 wherein the plurality of execution restrictions further includes a restriction on creating new processes by the respective application.

7. The system of claim 6 wherein the restriction on creating new processes further includes a restriction on creating a thread.

8. The system of claim 1 wherein the plurality of execution restrictions further includes a restriction on making of system function calls by the respective application.

9. The system of claim 1 wherein the volatile memory usage limit is the same for all of the applications in the plurality of applications.

10. The system of claim 1, wherein, to maintain scalability of the application execution system with respect to number of applications that can be executed and number of requests that can be processed per period of time, the plurality of execution restrictions further includes a requirement that all of the applications in the plurality of applications execute within a secure execution environment that prevents external access to memory locations within the application servers.

11. The system of claim 1, wherein each of the application servers includes instructions for preventing execution of a respective application that has violated any of the execution restrictions.

12. The system of claim 1, wherein each of the application servers further includes instructions for preventing loading into volatile storage of a respective application that has violated any of the execution restrictions.

13. The system of claim 1, wherein the average response time limit is applied to all applications executed by the application server.

14. The system of claim 1, wherein the average response time limit is no longer than 0.5 seconds.

15. The system of claim 1, wherein the plurality of execution restrictions further includes a restriction on number of requests for the respective application received per period of time.

16. The system of claim 1, wherein the plurality of execution restrictions further includes one or more restrictions on number of CPU cycles used per period of time associated with the respective application.

17. The system of claim 1, wherein the plurality of execution restrictions further includes a restriction on stack size associated with the execution of the respective application.

18. A method of operating an application server in a system having a plurality of application servers, the method comprising:
storing in non-volatile storage applications distributed to the application server;
loading a plurality of respective applications into volatile storage, executing a respective application in response to a respective received request from a client, and returning a result to the request;

conditionally terminating execution of the respective application prior to returning the result if the respective application violates any of a plurality of execution restrictions, the plurality of execution restrictions including two of more of the following:
a response time limit;
an average response time limit over multiple executions of the respective application;
a volatile memory usage limit that limits how much volatile memory can be used by each execution of the respective application;
a restriction on using non-volatile storage of the application server; and
a requirement that any state information to be retained after returning the result is either sent to the client for storage, or retained in a datastore accessible by all the application servers in the plurality of application servers;
wherein the plurality of execution restrictions in aggregate maintain scalability of the application execution system with respect to at least one or more of the following limits: number of applications that can be executed and number of requests that can be processed per period of time.

19. The method of claim 18, wherein all state information to be retained after returning the result is written using one or more predefined application programming interfaces (APIs).

20. The method of claim 19, wherein the one or more APIs include an API for accessing stored state information.

21. The method of claim 18, wherein the restriction on using non-volatile storage excludes reading and accessing data stored in the non-volatile storage.

22. The method of claim 18, wherein the plurality of execution restrictions further includes a restriction on opening network connections.

23. The method of claim 18, wherein the plurality of execution restrictions further includes a restriction on creating new processes by the respective application.

24. The method of claim 23, wherein the restriction on creating new processes further includes a restriction on creating a thread.

25. The method of claim 18, wherein the plurality of execution restrictions further includes a restriction on making of system function calls by the respective application.

26. The method of claim 18, wherein the volatile memory usage limit is the same for all of the applications in the plurality of applications.

27. The method of claim 18, wherein, to maintain scalability of the application execution system with respect to number of applications that can be executed and number of requests that can be processed per period of time, the plurality of execution restrictions further includes a requirement that all of the applications in the plurality of applications execute within a secure execution environment that prevents external access to memory locations within the application servers.

28. The method of claim 18, further comprising preventing execution of a respective application that has violated any of the execution restrictions.

29. The method of claim 18, further comprising preventing loading into volatile storage of a respective application that has violated any of the execution restrictions.

30. The method of claim 18, further comprising applying the average response time limit to all applications executed by the application server.

31. The method of claim 18, wherein the average response time limit is no longer than 0.5 seconds.

32. The method of claim 18, wherein the plurality of execution restrictions further includes a restriction on number of requests for the respective application received per period of time.

33. The method of claim 18, wherein the plurality of execution restrictions further includes one or more restrictions on number of CPU cycles used per period of time associated with the respective application.

34. The method of claim 18, wherein the plurality of execution restrictions further includes a restriction on stack size associated with the execution of the respective application.

35. A non-transitory computer readable storage medium storing one or more programs for execution by one or more processors of an application server in a system having a plurality of application servers, the one or more programs comprising instructions for: storing in non-volatile storage applications distributed to the application server;
loading a plurality of respective applications into volatile storage, executing a respective application in response to a respective received request from a client, and returning a result to the request;
conditionally terminating execution of the respective application prior to returning the result if the respective application violates any of a plurality of execution restrictions, the plurality of execution restrictions including two of more of the following:
a response time limit;
an average response time limit over multiple executions of the respective application;
a volatile memory usage limit that limits how much volatile memory can be used by each execution of the respective application;
a restriction on using non-volatile storage of the application server; and
a requirement that any state information to be retained after returning the result is either sent to the client for storage, or retained in a datastore accessible by all the application servers in the plurality of application servers;
wherein the plurality of execution restrictions in aggregate maintain scalability of the application execution system with respect to at least one or more of the following limits: number of applications that can be executed and number of requests that can be processed per period of time.

36. The computer readable storage medium of claim 35, wherein all state information to be retained after returning the result is written using one or more predefined application programming interfaces (APIs).

37. The computer readable storage medium of claim 36, wherein the one or more APIs include an API for accessing stored state information.

38. The computer readable storage medium of claim 35, wherein the restriction on using non-volatile storage excludes reading and accessing data stored in the non-volatile storage.

39. The computer readable storage medium of claim 35, wherein the plurality of execution restrictions further includes a restriction on opening network connections.

40. The computer readable storage medium of claim 35, wherein the plurality of execution restrictions further includes a restriction on creating new processes by the respective application.

41. The computer readable storage medium of claim 40, wherein the restriction on creating new processes further includes a restriction on creating a thread.

42. The computer readable storage medium of claim 35, wherein the plurality of execution restrictions further includes a restriction on making of system function calls by the respective application.

43. The computer readable storage medium of claim 35, wherein the volatile memory usage limit is the same for all of the applications in the plurality of applications.

44. The computer readable storage medium of claim 35, wherein, to maintain scalability of the application execution system with respect to number of applications that can be executed and number of requests that can be processed per period of time, the plurality of execution restrictions further includes a requirement that all of the applications in the plurality of applications execute within a secure execution environment that prevents external access to memory locations within the application servers.

45. The computer readable storage medium of claim 35, the one or more programs further comprising instructions for preventing execution of a respective application that has violated any of the execution restrictions.

46. The computer readable storage medium of claim 35, the one or more programs further comprising instructions for preventing loading into volatile storage of a respective application that has violated any of the execution restrictions.

47. The computer readable storage medium of claim 35, the one or more programs further comprising instructions for applying the average response time limit to all applications executed by the application server.

48. The computer readable storage medium of claim 35, wherein the average response time limit is no longer than 0.5 seconds.

49. The computer readable storage medium of claim 35, wherein the plurality of execution restrictions further includes a restriction on number of requests for the respective application received per period of time.

50. The computer readable storage medium of claim 35, wherein the plurality of execution restrictions further includes one or more restrictions on number of CPU cycles used per period of time associated with the respective application.

51. The computer readable storage medium of claim 35, wherein the plurality of execution restrictions further includes a restriction on stack size associated with the execution of the respective application.

\* \* \* \* \*